March 4, 1958   A. S. BADGER ET AL   2,825,584
THREADED PIPE COUPLING WITH BUSHING
Filed Nov. 18, 1955

INVENTORS.
Algernon S. Badger,
Robert R. Crookston,
BY John S. Schneider
ATTORNEY.

United States Patent Office 2,825,584
Patented Mar. 4, 1958

2,825,584

THREADED PIPE COUPLING WITH BUSHING

Algernon S. Badger and Robert R. Crookston, Houston, Tex., assignors, by mesne assignments, to Esso Research and Engineering Company, Elizabeth, N. J., a corporation of Delaware Application November 18, 1955, Serial No. 547,650

6 Claims. (Cl. 285—95)

The present invention is directed to a pipe coupling adapted to form a fluid-tight connection.

In many operations connected with the drilling of oil wells and the production of oil therefrom it is necessary to use strings of pipe which are connected together in a fluid-tight relation to form a conduit for fluids. For example, in the drilling operation a drill stem comprises lengths of drill pipe connected together to form a conduit through which drilling mud is circulated under high pressure as the drill string is rotated in the well bore hole. In the usual practice this drill string is maintained in tension, imposing considerable load on the connections between the pipe sections. Also, large torsional stresses are imposed upon these connections as the drill string is rotated in the borehole. The high pressure drilling fluid or mud circulated through the drill string tends to leak through the connections with resultant injury to and possible eventual destruction of the drill string and connecting parts. Also, tubular sections of pipe are connected together to form a conduit through which oil is produced after the well has been drilled. This pipe is also usually under tension and considerable loads are imposed on the connections. These loads, whether torsional or tensional, make difficult the prevention of leakage through the connections.

One object of the present invention is to provide a coupling for connecting two sections of tubular members together to form a fluid-tight conduit. A further object of this invention is to provide a fluid-tight connection that will not leak when subjected to high fluid pressures and high tensional and torsional forces.

Briefly, the device of the present invention comprises a pipe conduit having a first pipe section provided with threads on its interior surface, a second pipe section provided with threads on the exterior surface thereof, a cylindrically configured bushing provided with threads on the interior and exterior surfaces thereof threadedly arranged between the sections, the connection between the first pipe section threads and the exterior surface threads of the bushing providing a fluid chamber, the second pipe section threads tightly engaging with the interior surface threads of the bushing and closure means positioned between said first pipe section and the bushing adjacent one end thereof to prevent the passage of fluid flow from the conduit.

In one embodiment this device comprises a pipe conduit having a first pipe section provided with threads on its interior surface, a second pipe section provided with threads on its exterior surface, a cylindrical, relatively thin bushing provided with threads on its interior and exterior surfaces arranged between the sections, the first pipe section threads loosely threadedly connecting with the exterior surface threads of the bushing, the second pipe section threads tightly threadedly connecting with the interior surface threads of the bushing, and closure means positioned between the first pipe section and the bushing adjacent one end thereof to prevent the passage of fluid flow from the conduit. The loosely threaded

connection between the first pipe section and the bushing is adapted to close off tightly one side of adjoining threads when the first pipe section is under tensional force.

In another embodiment, this device comprises a first pipe section provided with threads on its interior surface, a second pipe section provided with threads on its exterior surface, a cylindrical, relatively thin bushing provided with threads on its interior and exterior surfaces arranged between the sections. The first and second pipe section threads tightly threadedly connect with the interior surface threads and the exterior surface threads, respectively, of the bushing. Portions of the adjoining threads of the first pipe section and the bushing are removed to provide a fluid chamber in each of the threads of the first pipe section and the bushing. A closure means is positioned between the first pipe section and the bushing adjacent one end thereof to prevent the passage of fluid flow from the conduit.

When thus assembled, in each embodiment, the aforementioned elements form a fluid-tight coupling between the pipe sections which remain fluid-tight when subjected to high pressures and high tensional and torsional forces.

The present invention will be further illustrated by reference to the drawing, in which.

Figure 1:
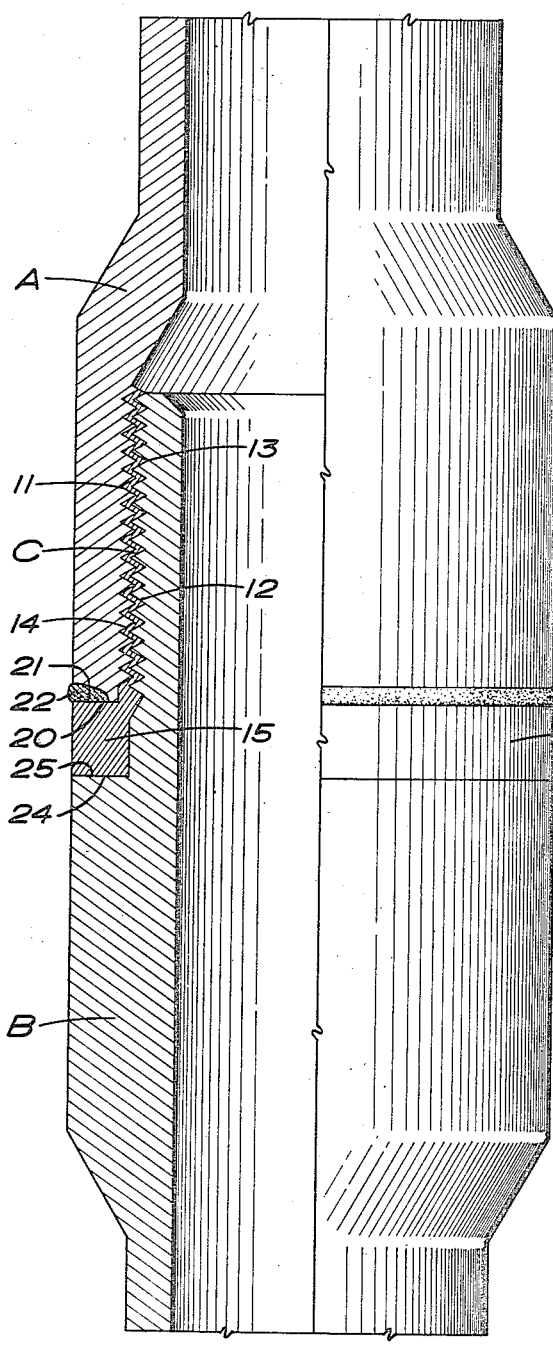
Fig. 1 is a vertical view, partly in section, of the pipe sections and bushing connected together.

Referring to the drawings in greater detail, letter A designates a tubular pipe section provided with threads 11 on the interior surface adjacent one end thereof. The letter B designates another tubular pipe section having a pin portion adjacent one end provided with threads 12 on its exterior surface. The letter C designates a cylindrical bushing having relatively thin walls and provided with threads 13 on its interior surface and threads 14 on its exterior surface. The bushing C is preferably provided with a flange portion 15 adjacent one end thereof extending to the outer surface of the pipe sections.

Figure 2:
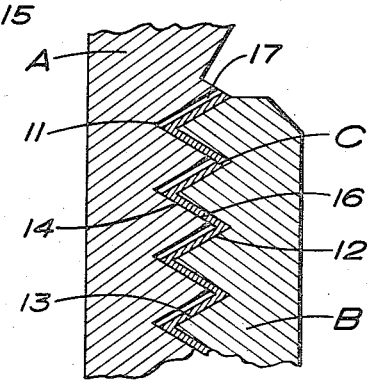
Fig. 2 is an enlarged view of one embodiment of the threaded pipe sections and bushing.

In one embodiment (Fig. 2) the interior threads 13 of the bushing C snugly connect with the threads 12 of the pin portion of pipe section B. The threads 11 of pipe section A loosely connect with the exterior threads 14 of bushing C. As shown in Fig. 2, pipe section A is subjected to a tensional force whereby the connection between the threads 11 and 14 form a tight connection on the lower side thereof, indicated as at 16, and form a loose connection on the upper portion thereof, as indicated at 17.

Figure 3:
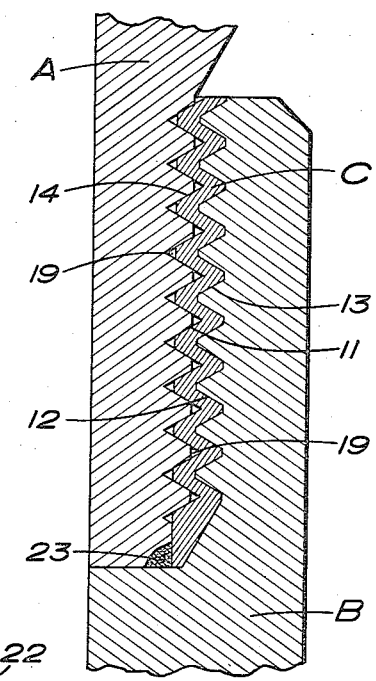
Fig. 3 is an enlarged view of another embodiment of the pipe sections and bushing.

In the embodiment shown in Fig. 3 the exterior and interior bushing threads 14 and 13, respectively, form a tight fit or engagement with the threads 11 and 12 of pipe sections A and B, respectively. In this instance, however, the interior threads 11 provided on pipe section A and the engaged exterior threads 14 provided on bushing C are cut to form fluid chambers 19 at each thread connection. As shown in Fig. 3 these chambers are formed by cutting off a portion of the crests or peaks of the threads of the pipe section A and the exterior surface threads of bushing C. However, it is contemplated that any means for providing a fluid chamber in the threaded connection between pipe section A and bushing C may be employed, such as sectioning through the interior portion of the threads to provide fluid chambers therein.

The members A, B and C in each embodiment are connected together, as shown in Fig. 1, to form a fluid-tight conduit. The threads 11 of element A threadedly connect with the threads 14 of element C. If the element C is provided with a flange 15 the pipe section A is screwed onto element C until the lower shoulder 20 of pipe section A abuts upon the upper surface 21 of the flange 15. Because the connection between the threads 11 and 14 is constructed to permit fluid flow therethrough, the fluid passing through the conduit when assembled has access to the space provided between these two sets of threads. Therefore, to prevent the escape of fluid through the space and thence to the outside of the conduit, a suitable closure is provided at 22 when the bushing C is equipped with a flange 15. If the bushing C is not provided with a flange 15, a suitable closure may be provided as at 23, as illustrated in Fig. 3. These closures 22 and 23 are preferably formed of welding material placed in their respective locations in any well known manner. It is to be understood that the closures 22 and 23 may comprise relatively easily removed material such as solder or plastic.

After the bushing C has been suitably connected to the pipe section A the pipe section B is threadedly connected with the bushing C by screwing threads 12 of pipe section B into threads 13 of bushing C. The pipe section B should be screwed into bushing C sufficiently far to cause the shoulder 24 of section B to abut against the lower shoulder 25 of the flange 15 (Fig. 1). It will be apparent that in the assembly illustrated in the drawing the fluid passing through the conduit formed by elements A, B and C has access to the space provided between the threads 11 and 14. This fluid being under pressure will tend to force the threaded portion of pipe section B outwardly causing thereby outward expansion of the pipe section A and deformation of the threaded connections. Through this operation the pressure of the fluid in chambers 17 and 19 of Figs. 2 and 3 respectively adjacent the threaded portion of the coupling equalizes the pressure across pipe section B and bushing C thereby preventing or decreasing the tendency of the pipe section B to deform with resulting deformation of the threaded connections. Thus the fluid pressure forces bushing C and pipe section B together and the fluid-tight connection between bushing C and pipe section B is maintained during high pressure fluid flow through the conduits when the conduits are subjected to high tensional or torsional forces.

It is to be noted that the crests of the threads on one side of the bushing are aligned with the valleys of the threads on the other side of the bushing to provide a relatively thin bushing. This is an important consideration in the drilling art since the diameters of the operational structures must be relatively small and any means whereby these diameters are decreased or maintained at a small value aids greatly in the design of oil well equipment. However, this construction is not to be considered as limited to aligned threads although this embodiment is preferred.

It will be apparent that any desired thread dope or sealing material may be applied to the threads 12 and 13 to prevent galling of these threads as they are engaged. Any of the commercially available sealing compounds may be used for this purpose, many of which are well known.

Having fully described and illustrated the nature and objects of the present invention, we wish to claim as new and useful and to secure by Letters Patent:

1. A pipe conduit comprising a first metallic pipe section provided with threads on the interior surface thereof, a second metallic pipe section provided with threads on the exterior surface thereof, the diameter of the crest of the threads on the first pipe section being at least substantially as large as the diameter of the crest of the threads on the second pipe section, a cylindrically configured thin metallic bushing provided with threads on the interior and exterior surfaces thereof arranged between said sections, the connection between said first pipe section threads and the exterior surface threads of said bushing being non-complementary and providing a fluid chamber, said chamber fluidly communicating with the interior of said pipe sections, said second pipe section threads tightly threadedly connecting with the interior surface threads of said bushing, and closure means positioned between said first pipe section and said bushing adjacent the outer end thereof to prevent the passage of fluid flow from said conduit.

2. A device as recited in claim 1 wherein the crests of the threads on one side of said bushing are aligned with the valleys of the threads on the other side of the bushing.

3. A device as recited in claim 1 wherein said chamber is provided adjacent one side of said threads of said first pipe section, the other side of said threads of said first pipe section being tightly engaged with the side of each of said threads of said bushing associated therewith.

4. A device as recited in claim 1 wherein said chamber is formed between the crests and valleys of mating threads of said first pipe section and said bushing.

5. A device as described in claim 3 wherein thread sealing material is provided between said second pipe section and said bushing.

6. A device as recited in claim 4 wherein thread sealing material is provided between said second pipe section and said bushing.

References Cited in the file of this patent

UNITED STATES PATENTS

| | | |
|---|---|---|
| 808,027 | Eager | Dec. 19, 1905 |
| 1,125,067 | Cook | Jan. 19, 1915 |
| 1,363,353 | Riker | Dec. 28, 1920 |
| 1,797,180 | Zerk | Mar. 24, 1931 |
| 2,145,168 | Flagg | Jan. 24, 1939 |
| 2,289,271 | Kane | July 7, 1942 |
| 2,407,552 | Hoesel | Sept. 10, 1946 |
| 2,781,206 | Ragland | Feb. 12, 1957 |